MULTI-SPEED PHONOGRAPH RECORD PLAYER

Filed May 28, 1956 6 Sheets-Sheet 1

INVENTOR.
George E. Redfield
BY H. L. Newton
ATTORNEY.

INVENTOR.
George E. Redfield
BY
H. W. Newton
ATTORNEY.

July 5, 1960 G. E. REDFIELD 2,943,861

MULTI-SPEED PHONOGRAPH RECORD PLAYER

Filed May 28, 1956 6 Sheets-Sheet 3

INVENTOR.
George E. Redfield
BY
H. L. Newton
ATTORNEY.

MULTI-SPEED PHONOGRAPH RECORD PLAYER

Filed May 28, 1956 6 Sheets-Sheet 4

INVENTOR.
George E. Redfield
BY H. L. Newton
ATTORNEY.

July 5, 1960 G. E. REDFIELD 2,943,861

MULTI-SPEED PHONOGRAPH RECORD PLAYER

Filed May 28, 1956 6 Sheets-Sheet 5

INVENTOR.
George E. Redfield
BY H. L. Newton
ATTORNEY.

July 5, 1960 G. E. REDFIELD 2,943,861

MULTI-SPEED PHONOGRAPH RECORD PLAYER

Filed May 28, 1956 6 Sheets-Sheet 6

INVENTOR.
George E. Redfield
BY H. L. Newton
ATTORNEY.

United States Patent Office 2,943,861

Patented July 5, 1960

2,943,861

MULTI-SPEED PHONOGRAPH RECORD PLAYER

George E. Redfield, Mount Holly, N.J., assignor to Radio Corporation of America, a corporation of Delaware Filed May 28, 1956, Ser. No. 587,695

3 Claims. (Cl. 274—9)

This invention relates to phonograph record players and more particularly to multi-speed phonograph record players which are operable to accommodate disc type phonograph records having different size center hole openings.

Developments in the phonograph art have resulted in the use not only of different playing speeds, but also of different spindle openings for present day records. Certain types of records such as the 78 r.p.m., 33⅓ r.p.m. and 16.6 r.p.m. records have "standard" or small diameter (.281 inch) center holes, while 45 r.p.m. records have a large diameter (1.5 inch) center hole. Since the 45 r.p.m. records are extremely popular from a commercial standpoint, most multi-speed record players include provisions for playing these records in addition to one or more of the other small diameter center hole type records.

In certain types of record players such as those of the type having a cabinet with a lateral slot through which a record is inserted for playing, the operating mechanism including the turntable and tone arm are enclosed in the cabinet, and need not be easily accessible to the person operating the record player. Since it is desirable to adapt such record players for the reproduction of large center hole 45 r.p.m. records as well as small center hole records of other turntable speeds, it is necessary to provide a record centering mechanism which insures that either the large or small center hole records will be accurately centered on the record player turntable without relying on the accuracy of an operator in the placement of the record over a turntable centering spindle.

It is accordingly an object of this invention to provide a universal record centering device for multi-speed record players wherein records having either small (.281 inch) diameter or large (1.5 inch) diameter center holes are accurately and automatically centered when generally placed on the turntable of the record player.

Another object of this invention is to provide an improved multi-speed record player wherein the speed of rotation of the record player turntable is automatically controlled in accordance with the diameter of the center hole of a record on the turntable.

Still another object of this invention is to provide an improved multi-speed record player for either of two types of records which are to be reproduced at different speeds of rotation and which have different diameter center holes wherein either of said types of records are automatically centered on the record player turntable, and the speed of rotation of the turntable is automatically selected in accordance with the diameter of the center hole of the record on the turntable.

A further object of this invention is to provide a two-speed slot type record player which has a mechanism of simple and rugged construction for receiving and automatically playing, one at a time, either of two types of records which are to be reproduced at different speeds of rotation and which have different diameter centering holes.

In accordance with the invention, the record player is provided with a universal record centering system for accurately and automatically centering either large or small center hole records. The universal centering system includes a record centering disc for large center hole records loosely supported above the surface of the turntable. The record centering disc and the turntable are relatively movable from a first spaced apart or record loading position to a second record playing position where the disc engages a record on the turntable. When a large center hole record is to be played, the centering disc slips through the center hole to hold the record in the proper centered position on the turntable. If the record is initially positioned off-center on the turntable, the loosely supported centering disc tilts into the large diameter center hole and tends to cam the record into the proper position as the turntable and centering disc are relatively moved to the record playing position. A small diameter spindle for centering small center hole records is provided for cooperation with the turntable and the centering disc, and may be mounted either on the central axis of the turntable or the centering member.

Since the different size center hole records must be rotated at different speeds for reproduction, a sensing mechanism is provided to automatically control the speed of rotation of the record player turntable in accordance with the size of the center hole of the record on the turntable.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 1, 2:
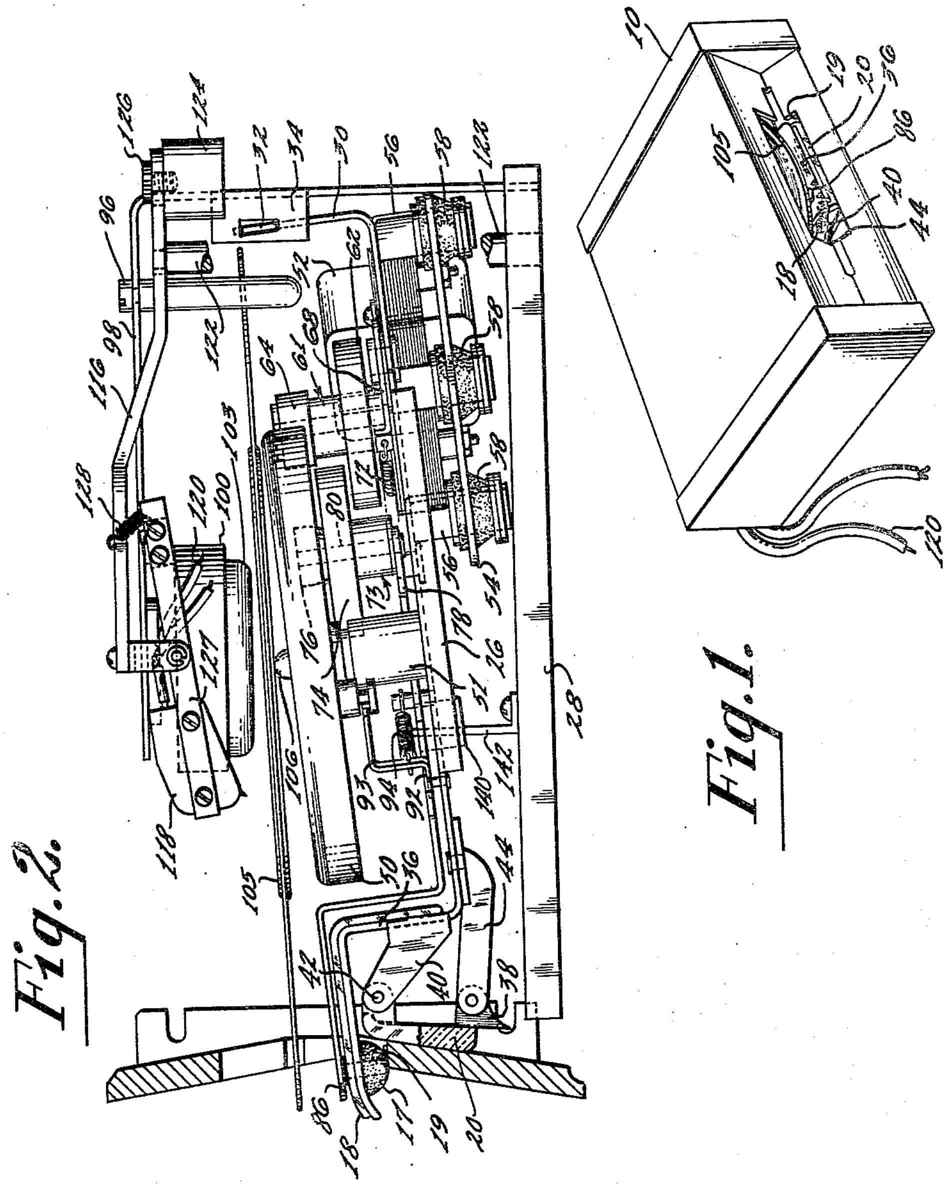
Figure 1 is a perspective view of a two-speed slot type record player constructed in accordance with the invention and showing a record in the record playing position.
Figure 2 is a side elevational view of the record player shown in Figure 1, on an enlarged scale, having the cabinet removed to show certain constructional details of the record playing mechanism in the record loading position.

Referring now to the drawings wherein like reference characters designate like parts throughout, and referring more particularly to Figure 1, the multi-speed record player of the invention is illustrated as an assembly not including a self-contained amplifier or loadspeaker and requires an external connection to a suitable amplifier and loadspeaker. Naturally, if desired, the cabinet 10 could be enlarged to receive an amplifier and loudspeaker.

The record player, which by way of example is designed to receive and play either the large center hole 45 r.p.m. type record or the small center hole 16.6 r.p.m. type record, is particularly well adapted for vehicular use, and the cabinet 10 thereof may, if desired, be provided with suitable mounting brackets for securing the record player at the appropriate place on the vehicle. The cabinet 10 which may be styled to suit the tastes of the designer is provided with a slot in the front side thereof. The ends 12 of the slot have a horizontal dimension or width substantially corresponding to the diameter of a phonograph record, which as mentioned is a 7-inch 45 r.p.m. or 16.6 r.p.m. record. The ends 12 of the slot provide a record loading guide through which a record may be inserted and guided onto the turntable without touching other parts of the record playing mechanism such as the tone arm. When the record is centered on the turntable, part of the record still projects from the cabinet 10 to facilitate removal thereof. The slot also has an intermediate portion 14 of increased vertical dimension, from which a record extends during the record playing cycle, and which is of sufficient dimension so the record may undulate without rubbing against the dge of the slot.

After a record 16 has been loaded on the turntable, the motorboard and turntable, as will be hereinafter described, are raised by means of the control lever 18 to bring the record into engagement with suitable record reproducing means. In the record playing position, the control lever 18 and the latch 20 effectively block the record loading portion of the slot so that a record may not be forced in while the mechanism is in the record playing position. Furthermore, the lateral dimension of the intermediate slot portion 14 is small enough so that a record may not be withdrawn while the reproducing means is in contact therewith.

The latch 20, which is pivotally mounted, moves to rest against the edge of a slot portion 19 as the control lever 18 is raised, and thus supports the motorboard and turntable in the upper record playing position. At the completion of the record playing cycle, an automatic tripping mechanism may be provided to disengage the latch 20 by pulling it back away from the edge 19 to allow the turntable and motorboard to fall to the record loading position, so the record just played may be removed, and a new record inserted for playing. The operator may manually stop the record player by merely depressing the latch 20 and allowing the control lever and motorboard to fall to the record loading position.

A power cord 22 is provided for connection with a suitable power source for energizing the turntable drive motor. A second electrical connecting lead 24, which may have a braided metallic shield, is provided for conveying the audio frequency signals from the phonograph record reproducer or pickup to a suitable amplifier.

Referring now to Figure 2, the phonograph record player mechanism of the invention is removed from the cabinet 10 to show the relative position of the operating components thereof in the record loading position. The record player is shown in side elevational view with the front panel of the cabinet 10 which forms an integral part of the record player chassis remaining in position at the left-hand side of the drawing and the rear side of the record player at the right. Most of the operating elements of the record player except for the tone arm and the drive motor on-off switch, are mounted on a motorboard 26 which is hinged at the rear side of the record player supporting frame 28. The motorboard 26 has an upstanding flange 30 toward the rear side thereof, and a pair of lateral supporting arms 32 extend in opposite directions from the flange 30 to provide the rear support and hinge elements for the motorboard 26. The supporting arms 32 extend through apertures in the hinge mounting brackets 34 which form an integral part of the record player supporting frame 28. The apertures in the hinge mounting brackets 34 are large enough to permit easy pivoting of the motorboard on the supporting arms 32 whereby the front of the motorboard may easily be raised by the manual control lever 18 to a horizontal position as shown in Figure 3.

An upstanding extension 36 on the front edge of the motorboard 26 connects the motor board with the manual control lever 18. The control lever 18 rests against the edge 19 of the slot and limits the travel of the motorboard in the lowermost position. A button 17 which may be made of rubber or other resilient material is fastened to the underside of the control lever 18 in a position to strike the edge 19 to reduce the shock on the record changer parts as the motorboard falls from the upper record playing to the record loading position.

Figure 3:
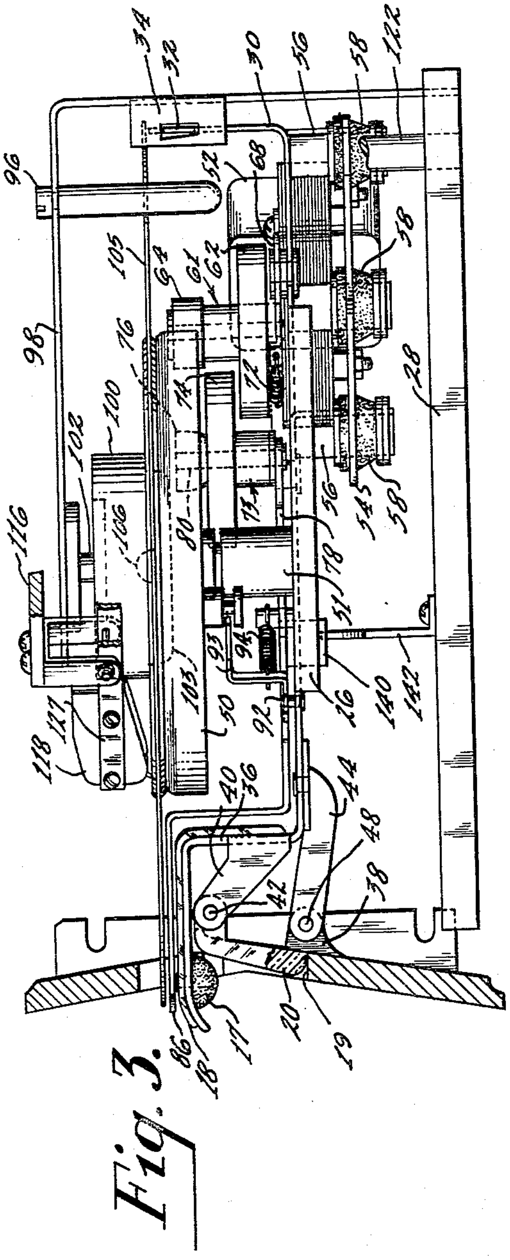
Figure 3 is a similar side elevational view of the record player of Figure 1, with said mechanism shown in the record playing position.

The latch 20 holds the motorboard 26 in the upper position during a record playing cycle by moving into the position shown in Figure 3, so that the bottom portion thereof engages the edge 19. A projection 38 on the rear surface of the latch 20 and extending therebelow provides a stop for the outward movement of the latch by engaging the inner wall of the front panel of the cabinet 10 to limit the travel of the latch over the edge 19, and insure positive latching action. The latch 20 is supported at the upper end by a support bracket 40 which may be an integral part of the motorboard extension 36. A pin 42 fastens the upper end of the latch 20 to the support bracket 40, to permit pivotal movement of the latch 20.

At the lower end, the latch 20 is fastened by a pin 48 to an extension 44 of a latch release lever. The latch release lever 46 is laterally movable by a suitable tripping mechanism away from the front edge of the cabinet to pull the latch 20 back away from the edge 19, thus allowing the motorboard 26 to fall by gravity, from the record playing position as shown in Figure 3 to the record loading position as shown in Figure 2.

Figure 5:
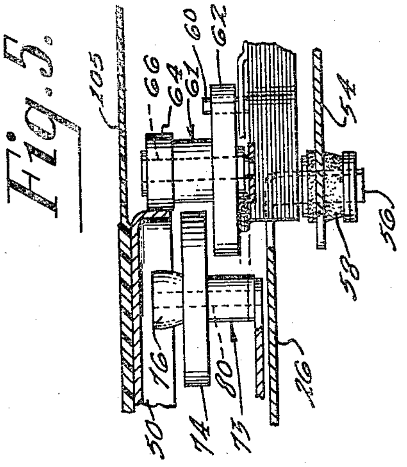
Figure 5 is a sectional view of the turntable driving mechanism, taken along the section lines 5—5 of Figure 10.
Figure 4:
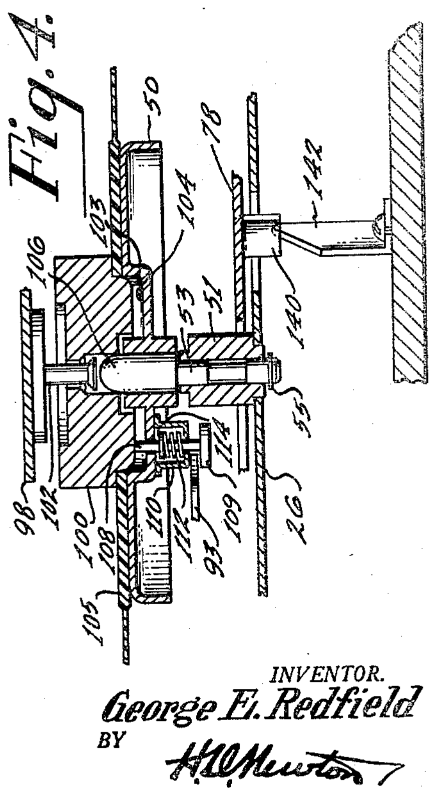
Figure 4 is a sectional view of the record centering system and automatic speed control sensing member taken along the section lines 4—4 of Figure 10 and showing the relative positions of these parts with a large center hole record in the record playing position.
Figure 6:
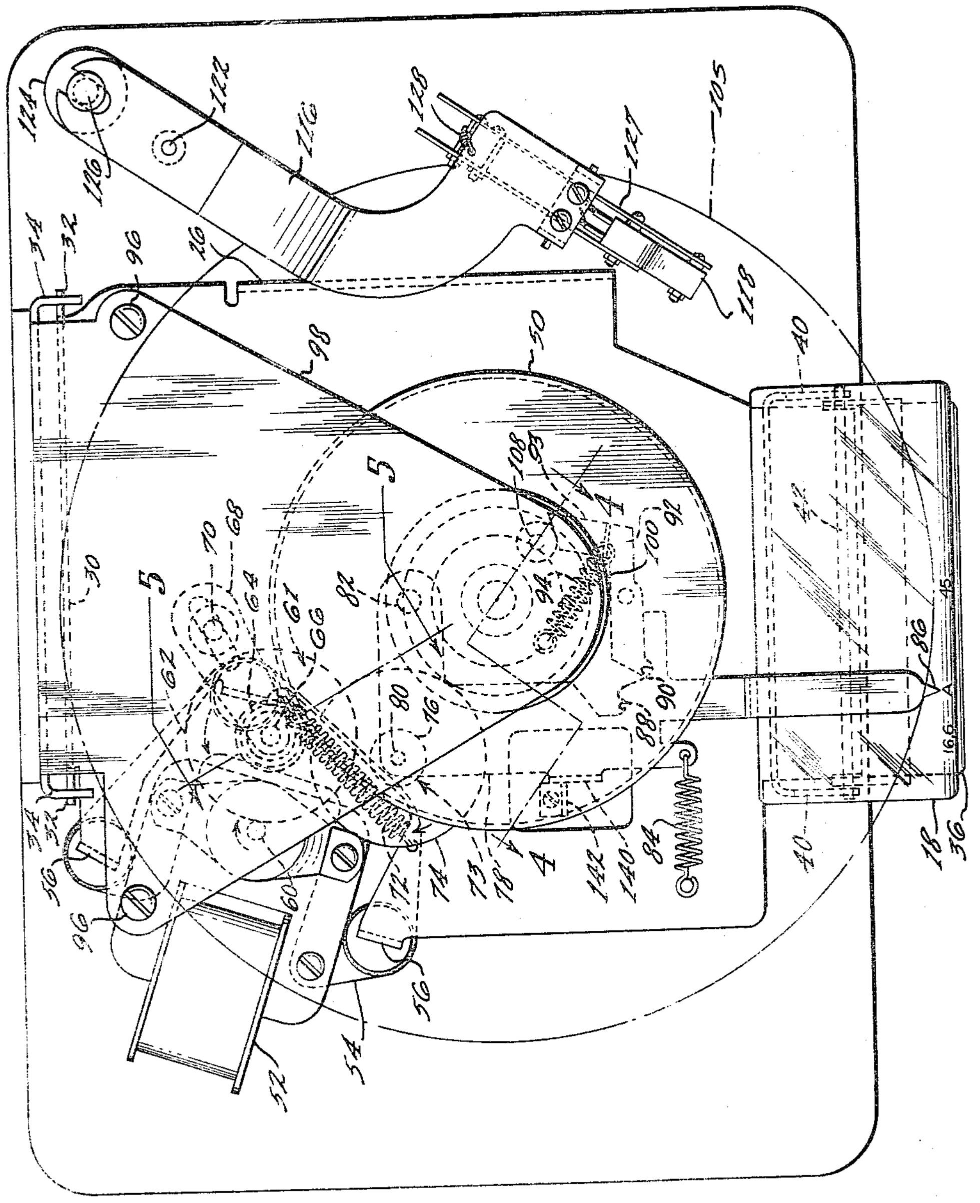
Figure 6 is a plan view of the record player shown in the preceding figures in which the turntable driving mechanism is set to automatically drive the turntable at a speed which is controlled by the diameter of the center hole of a record on the turntable.

Referring now to Figures 4 and 5 along with Figures 2 and 3, and the multi-speed record rotating means, a turntable 50 having an annular depending flange is mounted for rotation on the pivotal motorboard 26. The turntable 50 rotates on a shaft 53 extending from the lower side thereof, the shaft being journaled for rotation in the bearing 51. The bearing 51 is mounted on the motorboard 26 and a C washer 55 is fastened in a groove on the shaft 53 to hold the turntable in place. The turntable is preferably of large enough diameter to cover at least the label portion of the phonograph record, but in general the actual diameter is not critical, and it is primarily a design consideration. In the present example, the turntable 50 may be considered to be driven at either of two speeds, 45 r.p.m. of 16.6 r.p.m., by a drive system including a turntable drive motor 52 which is supported on a motor mounting plate 54. The motor mounting plate 54 is affixed to downwardly extending flanges 56 from the motorboard 26. Rubber grommets 58 are inserted between the flanges 56 and the motor mounting plate 54 to isolate the motorboard insofar as possible from motor vibration.

Referring now to Figures 6, 7, 8 and 9 along with the preceding figures, the motor 52 is provided with a drive shaft 60 which engages and drives the large diameter surface 62 of a stepped pulley 61. The stepped pulley 61 which also includes a smaller diameter turntable driving surface 64 is mounted for rotation on a stud 66 which is fastened to one end of a pivotally mounted lever 68. The lever 68 provides a floating mount for the stepped pulley 61 since the lever is loosely fastened to the motorboard 26 by a screw 70 which extends through an elongated slot in the free end thereof, thereby to permit both longitudinal and pivotal movement. A spring 72 is fastened between the lever 68 and the motorboard 26 so that the idler wheel 62 and turntable drive roller 64 are firmly pulled into engagement with the motor drive shaft 60 and the outer rim of the turntable 50 respectively for driving the turntable at 45 r.p.m.

A second stepped pulley 73 which includes a large diameter driving surface 74 and a second smaller diameter turntable driving surface 76 is mounted on the pivotally movable plate 78 by a stud 80. The plate 78 is fastened at one end thereof to the motorboard 26 by a loosely driven rivet 82, and urged in a clockwise direction by a spring 84. The plate 78 is provided with a forwardly extending portion which terminates in a pointer 86 which extends over the control lever 18 to be available to a person operating the record player for the purpose of manually selecting the speed of operation of the turntable 50, as will be explained hereinafter.

Figures 7, 8, 9:
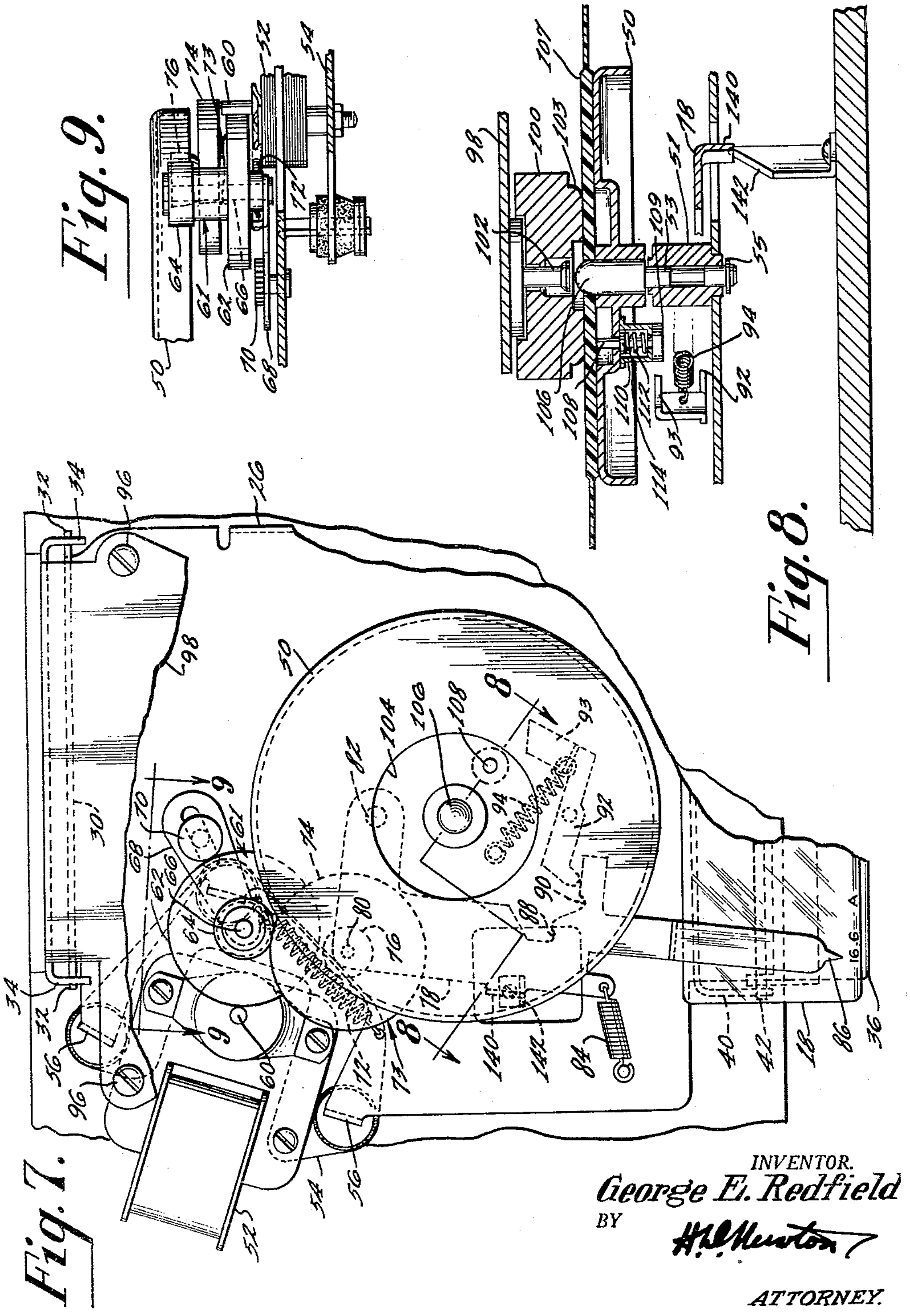
Figure 7 is another plan view of the record player, partly broken away, showing the relative position of certain operating elements when the speed changing mechanism of the record player is set to rotate the turntable at the lower of two speeds.
Figure 8 is a sectional view of the record centering system and automatic speed control member taken along the section lines 7—7 of Figure 6 and showing the relative positioning of these elements with a small center hole record positioned on the turntable.
Figure 9 is an elevational view of the turntable drive system of the record player in a position to rotate the turntable at the lower of two speeds, taken along the section lines 8—8 of Figure 6.

In the extreme clockwise position of the plate 78, the large diameter driving surface 74 bears against an intermediate portion of the stepped pulley 61 forcing the stepped pulley to the position shown in Figure 7 where the smaller diameter turntable driving surface 64 no longer engages the outer rim of the turntable 50. In this position the turntable driving surface 76 of the stepped pulley 73 engages the inside of the depending turntable flange to drive the turntable at 16.6 r.p.m. For the 16.6 r.p.m. operation, the stepped pulley 61 operates as an idler to transmit motion from the motor drive shaft 60 to the stepped pulley 73. It can be seen that the stepped pulley 73 rotates in the opposite direction from the stepped pulley 61. However, the turntable continues to rotate in the proper direction since the drive rollers 64 and 76 bear against opposite sides of the depending turntable flange in their respective driving positions.

It is understood that any other desired combination of driving speeds for the turntable may be used by proper selection of the dimensions of the stepped pulleys 61 and 73.

As the detent plate 78 is pivoted in a counter-clockwise direction, the stepped pulley 73 is moved out of engagement with the stepped pulley 61 and the turntable 50, and the turntable driving surface 64 on the stepped pulley 61 is urged into engagement with the outer rim of the turntable by the spring 72. The plate 78 may be held in this counter-clockwise position against the force of the spring 84 by a detent mechanism comprising a pair of notches 88 and 90 on an edge of the plate 78 and a cooperating lever 92 which is pivotally mounted on the motorboard 26. A spring 94 is connected between the lever and the motorboard to urge one end of the lever 92 into one or the other of the notches 88 and 90 to retain the plate 78 in the selected position.

As mentioned above, the plate 78 terminates in a pointer 86 which extends over the control lever 18. Suitable indicia such as "16.6," "A," and "45" may be inscribed on the top surface of the control lever 18 to indicate the speed of operation of the turntable. In the "16.6" position the turntable will be rotated at 16.6 r.p.m., and in the "45" position, the turntable will be rotated at 45 r.p.m. If the pointer is set to the "A" position, the speed at which the turntable is rotated will be automatically determined in accordance with the size of the center hole of a record on the turntable 50, as will be explained hereinafter.

The record player of the invention is operable to automatically center small diameter (.281 inch) center hole records, or large diameter (1.5 inch) center hole records on the turntable 50 when the records are inserted through the slot in the front panel of the cabinet 10. As a record is inserted for playing, the general position of the record with respect to the turntable is controlled by the slots 12 and the guide pins 96 which extend downwardly from a bracket 98. The bracket 98 is an integral part of the record player supporting frame 28 and projects over the center of the turntable 50.

A relatively heavy centering disc 100 is loosely supported by a pin 102 from the bracket 98 in a position generally over the central axis of the turntable 50. The centering member has a well-rounded pilot 103 at the bottom thereof which is slightly less than one and a half inches in diameter, and adapted to slip into the central aperture of a large center hole record placed on the turntable 50. A well 104 is provided in the turntable 50 for receiving that portion of the centering pilot 103 which extends through the record thereby insuring that the centering member 100, and a record 105, referring particularly to Figure 4, are accurately centered on the turntable. The loose fit between the centering member 100 and the pin 102 permits the centering member to rotate freely with the record 105, and the weight of the centering member on the record helps to prevent slippage between the turntable 50 and the record 105.

A spindle 106 for centering small diameter center hole records is centrally mounted on the turntable 50. As shown more particularly in Figure 8, a record 107 of this type is centered on the spindle 106, and the record centering member 100 rests on top of the record. A suitable recess is provided in the bottom of the record centering member 100 for receiving the spindle 106, when the turntable is moved into the record playing position.

When a record is inserted through the loading slot for playing, it may not be accurately centered on the turntable. As the motorboard 26 is moved upwardly to the record playing position, with an uncentered large center hole record on the turntable, the rounded or pilot portion 103 of the centering member 100 will fall or tilt into the center hole exerting an additional force which tends to cam the record into the centered position. However, even if the record is too far off-center to permit this to happen, in the record playing position, the turntable driving motor is energized, and an improperly centered record will rotate eccentrically. The eccentric motion of the record causes it to strike the guide pins 96 or the edges of the slot portion 14 to position the record on the turntable. The weight of the centering member 100 holds the record firmly on the turntable causing the record to seek the proper centered position either on the spindle 16 for small diameter records, or the pilot 103 for large diameter records. With this universal centering system, it has been found that a record which is as far off-center as possible within the limits set by the guide pins and slot portion 14 will be accurately centered in one quarter to one half of a turntable revolution.

From the foregoing, and by reference particularly to Figures 4 and 8, it can be seen that for large center hole records, the pilot 103 of centering member 100 extends into the central well 104 of the turntable 50, but for small center hole records, the pilot 10 rests on the top surface of the record entirely out of the turntable well 104. This difference in position of the centering device is used to sense whether a large or a small diameter center hole record is on the turntable, and adjust the turntable speed accordingly.

The automatic speed control sensing member comprises a pin 108 which extends upwardly from the turntable well 104. The pin 108 is mounted in a housing 110 beneath the turntable and is spring biased upwardly by a spring 112 which bears against the bottom of the housing 110 and a collar 114 on the pin.

For small center hole records, the uppermost position of the pin 108 is limited by the head 109 which bears against the bottom of the housing 110 as shown in Figure 8. For this condition, the head 109 of the pin 108 is positioned to strike, with rotation of the turntable, an upstanding end 93 of the detent lever 92, when the pointer 86 is set for automatic operation. When the head 109 of the pin 108 strikes the end 93 of the lever 92, the lever pivots on its axis in a clockwise direction, releasing the plate 78, which in turn is then pulled under the force of the spring 84 in a clockwise direction to set the turntable drive for 16.6 r.p.m. operation.

Figure 10:
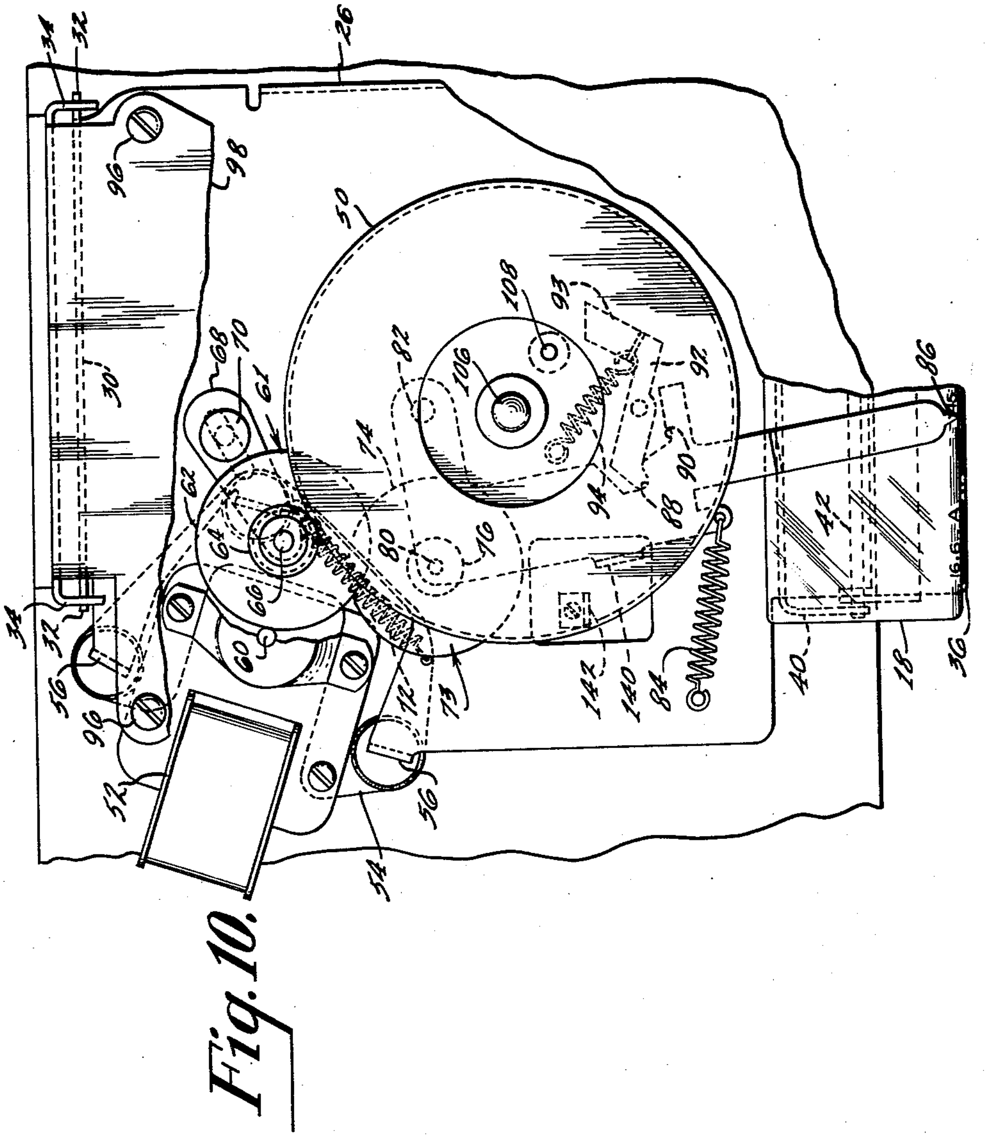
Figure 10 is another plan view of the record player, partly broken away, showing the relative position of certain operating elements when the speed changing mechanism is set to rotate the turntable at the lower of two speeds.

When a large diameter center hole record is positioned on the turntable 50, the centering member 100 extends into the turntable well 104 depressing the pin 108. As shown in Figure 4, the head 109 of the pin 108 is depressed far enough to pass beneath the end 93 of the lever 92 as the turntable rotates, and therefore the lever 92 will continue to hold the plate 78 in the position shown in Figure 6. In this position the turntable driving mechanism is set for 45 r.p.m. operation which is the correct speed for large center hole records of the type currently being manufactured and sold. For the 16.6 r.p.m. or 45 r.p.m. positions of the pointer 86 as shown in Figures 7 and 10, respectively, the end 93 of the lever 92 is pivoted out of the path of the head 109 of the pin 108.

A tone arm 116 is pivotally supported at one end thereof in the upper portion of the cabinet 10 in such a manner that the stylus of a pickup or cartridge 118 carried at the free end of the tone arm is positioned above the lead-in groove of the record to be played. A pair of twisted leads 120 connect the pick-up cartridge, which may be of the crystal or ceramic type, for example, to the shielded audio lead 24 as shown in Figure 1. The tone arm 116 is pivotally mounted on the shaft 122, the shaft being supported by the record player supporting frame 28. A weight 124 is fastened to the rear end of the tone arm 116 by a screw 126. The weight 124 is longitudinally adjustable along the rear end of the tone arm to a position at which the tone arm is laterally balanced.

Since the tone arm itself is not pivotally movable in a vertical plane, the pickup is supported at one end of a lever 127 which is pivotally mounted at the free end of the tone arm 116 to permit the pickup to move in a vertical direction when the phonograph record is brought into contact therewith. A spring 128 is connected with the other end of the lever 127 to bias the pickup in a direction toward the record with a force sufficient to provide the proper stylus tracking pressure so that the stylus will follow the record grooves. This tone arm structure is particularly designed for vehicular use, and is adapted to maintain the pickup 118 in correct tracking relation with the record when the turntable is not level, and when the vehicle makes quick turns, etc.

A spring, not shown, is connected between the record player supporting frame 28, and the tone arm pivot shaft 122 so that in the absence of the phonograph record in the playing position, the tone arm 116 will be spring biased toward the starting position at the right-hand side of the cabinet 10. A tone arm stop member, not shown may be formed as an integral part of the cabinet wall or supporting frame 28 to limit the movement of the tone arm 116 as it swings back to the starting position so that the pickup stylus will be directly above the lead-in groove of a record positioned on the turntable.

In the ordinary operation of the record player, the pointer 86 is manually set to the "A" position as indicated on the top of the control lever 18. In this position, the record player is set to automatically center and play either large center hole 45 r.p.m. records or small center hole 16.6 r.p.m. records. The reason for also including the 16.6 and 45 r.p.m. positions for the pointer 86 is to anticipate the use of small center hole 45 r.p.m. records such as 45 r.p.m. records with center hole adaptors, or large center hole 16.6 r.p.m. records.

A record is then inserted for playing when the motorboard and turntable are pivoted to the lower record loading position as shown in Figure 2. The record is guided onto the turntable by the limitations of the record loading slot 12 and the guide pins 96 which extend downwardly from the bracket 98, and a stop provided by the motorboard flange 30. The control lever 18 is then manually raised until the latch 20 snaps into place on the slot edge 19. The movement of the motorboard 26 to the upper position can be used, if desired, to actuate a switch, not shown, to energize the turntable drive motor 52 to rotate the turntable and the record thereon, as shown for example in the copending application of Benjamin R. Carson, Ser. No. 453,555. The pickup 118 stylus of the tone arm 116 engages the lead-in groove of the record in the upper position of the motorboard 26 and follows the groove towards the center of the record.

To turn the record player off at any time during the record playing cycle, the latch 20 is manually depressed to release it from the edge 19 thereby allowing the motorboard and turntable to fall to the lower record loading position. If, however, the record is played to completion, a tripping mechanism similar to the tripping mechanism shown and described in the aforesaid copending application of Benjamin R. Carson may be provided to release the latch 20 and permit the motorboard to fall in the record loading position, so that the record may then be removed through the slot 12.

If the record inserted through the record loading slot is a 45 r.p.m. record having a large diameter center hole, the pilot 103 of the centering member 100 slips through the central aperture of the record into the well 104 around the center of the turntable 50, to accurately center the record on the turntable. When the pilot 103 enters the well 104, the pin 108 is depressed and the head 109 of the pin 108 moves to a position below the end 93 of the lever 92 so that the end 93 will pass between the bottom of the housing 110 and the head 109 of the pin 108 as the turntable rotates. The lever 92 thus continues to hold the plate 78 in the initial position which is set to drive the turntable 50 at 45 r.p.m.

When a small center hole 16.6 r.p.m. record is inserted through the loading slot 12, it is centered on the turntable by the spindle 106. The centering member 100 rests on top of the record, the weight thereof insuring a firm driving engagement between the record and the turntable 50. Since the pilot 103 of the centering member 100 does not extend into the turntable well 104, the pin 108 is not depressed, and the head 109 of the pin abuts against the bottom of the housing 110. Under these conditions the head 109 of the pin 108 is in a position to strike the end 93 of the lever 92 as the turntable rotates. When the pin hits the lever 93, the lever is rotated in a clockwise direction against the force of the spring 94 thereby releasing the plate 78 which is pulled by the spring 84 in a clockwise direction to the 16.6 r.p.m.

turntable driving position, and the turntable will be driven at the proper playing speed for the normal small center hole seven-inch record.

After the completion of playing of a 16.6 r.p.m. record, the motorboard 26 falls to the record loading position as aforesaid. As the motorboard falls, a tab 140 on the pivoted plate 78 strikes an inclined member 142 which is mounted on the record player frame 28 driving the plate 78 back to the position where the end of the lever 92 engages the detent 90. Thus in the record loading position of the motorboard 26, the turntable driving mechanism is reset to the 45 r.p.m. position, and in the "A" or automatic position of the pointer 86, the turntable speed will be controlled by the size of the record placed on the turntable as aforesaid.

The record centering member and automatic speed changing mechanism of the invention may assume alternative forms. For example, with reference to Figures 11 and 12, the spindle 106′ is mounted in the central axis of the centering member 100′ and extends downwardly therefrom, so that as the motorboard is raised to the record playing position, the spindle 106′ and/or the record centering member 100′ may slip into the center hole of the record and accurately centers the record on the turntable 50′. For example, in Figure 11, a small center hole record 107′ is positioned on the turntable 50′, and the spindle 106′ extends through the center of the record and into a guide hole in the center of the turntable 50′ to accurately position the record 107′ on the turntable. The weight of the centering member 100′ serves to minimize the record slippage by insuring firm contact between the record 107′ and the turntable 50′.

Figure 11:
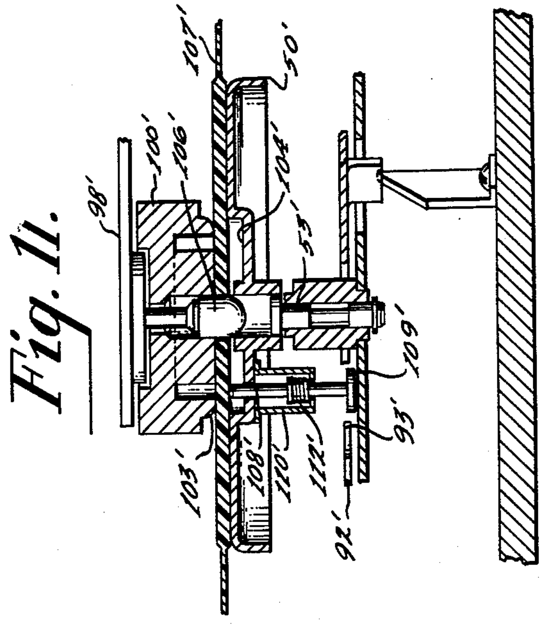
Figure 11 is a sectional view of a modification of the record centering and speed control sensing member shown in Figure 8, in accordance with the invention.

A modification of the automatic speed changing mechanism is also shown in Figure 11 wherein the pin 108′ is limited in its upward movement by the small center hole record on the turntable. In this position the head 109′ of the pin 108′ is on the same vertical level as the end 93′ of the lever 92′ so that continued rotation of the turntable will cause the pin 108 to strike the lever 92′ thereby releasing the plate 78 and setting the turntable drive mechanism for 16.6 r.p.m. operation.

Figure 12:
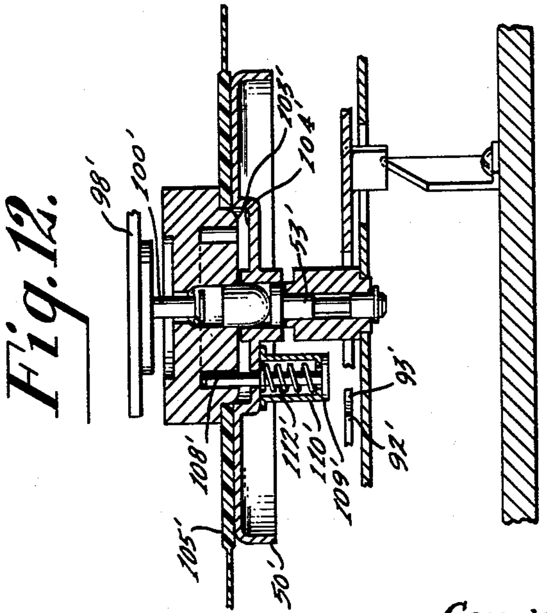
Figure 12 is a similar sectional view of a modification of the record centering and speed control sensing member shown in Figure 4, in accordance with the invention.

With reference to Figure 12 when a large diameter center hole record is positioned on the turntable 50′, the pilot 103′ of the centering member 100′ slips through the central aperture of the record 105′ into the well 104′, thereby centering the record on the turntable. In this embodiment of the invention, the centering member 100′ is provided with an annular slot in the bottom surface thereof for receiving the top end of the pin 108′. Thus, for 45 r.p.m. large center hole records, the pin 108 moves under the force of the spring 112′ into a second upper position with the end thereof extending into the annular slot. In this position the head 109′ of the pin 108′ will abut the bottom surface of the housing 110′ and will be in a position not to strike the lever 93′ upon rotation of the turntable 50′. Accordingly, the speed change mechanism will remain set for 45 r.p.m. operation. The construction of a record player incorporating the modified centering and speed changing mechanism is otherwise the same as that described with reference to Figures 1 and 10 above.

It can be seen in accordance with the foregoing that in accordance with the invention an improved phonograph record player has been provided which has an extremely simplified operating mechanism for accommodating either of two types of records which are to be reproduced at different speeds of rotation and which have different diameter center holes by automatically centering either type of said records on the record player turntable and automatically controlling the turntable speed in accordance with the diameter of the center hole of the record positioned on the turntable.

What is claimed is:

1. In a slot type phonograph record player of the type having a cabinet enclosing record playing mechanism including a substantially horizontal rotatable turntable, said cabinet having a slot in one side thereof adjacent said rotatable turntable and through which records are inserted for playing, the combination of means for guiding a record manually inserted through said slot to a position over said turntable comprising guide pins extending beyond the periphery of and parallel to the axis of a record positioned on said turntable, a weighted first record centering member loosely supported for pivotal and rotational motion above said turntable and having a rounded bottom end portion of a dimension for entry into the center hole of large center hole records and a flanged portion of larger dimension than the center hole of large center hole records positioned above said end portion, means providing a central well in said turntable for receiving and aligning said rounded end portion with a central axis of said turntable, means providing relative movement between said first record centering member and said turntable from a spaced-apart record loading position to an adjacent record playing position wherein said rounded end portion extends into said turntable well to center a large center hole record positioned on said turntable and means providing a second record centering member comprising a spindle supported on and extending along the central axis of said turntable, said spindle having a portion of a dimension for entry into the center hole of small center hole records, the flanged portion of said first centering member engaging and resting on the top surface of a large center hole record to be played, and the rounded bottom end portion of said first centering member engaging and resting on the top surface of a small center hole record to be played.

2. In a phonograph record player for accommodating either large center hole records or small center hole records, the combination of a first record centering member having a pilot portion of a dimension for entry into the center hole of large center hole records, a rotatable turntable for supporting a record to be played and having a central well therein for receiving and aligning said pilot portion with the central axis of said turntable, means loosely supporting said first centering member above said turntable, means providing relative movement between said first record centering member and said turntable from a spaced apart record loading position to an adjacent record playing position wherein said pilot portion extends into said turntable well to center a large center hole record positioned on said turntable, and means providing a second record centering member comprising a spindle mounted on said turntable at the central axis thereof and having a portion of a dimension for entry into the center hole of small center hole records aligned with the central axis of said turntable in said record playing position to center small center hole records positioned in said turntable, said first centering member being positioned by said supporting means for engaging and resting on the top surface of a small center hole record to be played.

3. In a phonograph record player for playing either large center hole records or small center hole records, the combination with a rotatable turntable for supporting a record to be played, of a first record centering member for insertion into the center hole of large center hole records, means loosely supporting said centering member above said turntable, means for relatively moving said first record centering member and said turntable between a spaced apart position for loading a record on said turntable and an adjacent record playing position wherein said first record centering member is operable to center a large center hole record positioned on the turntable, and means providing a second record centering member comprising a spindle mounted on said turntable at the central axis thereof for insertion into the center hole of small center hole records, said second record centering member being aligned with the central axis of said turntable in said record playing position to center a small center hole record positioned on said turntable in said spaced apart position, said first record centering member being positioned by said supporting means for engaging and resting on the top surface of a small center hole record to be played.

References Cited in the file of this patent

UNITED STATES PATENTS

| | | |
|---|---|---|
| 2,518,232 | Giovannucci et al. | Aug. 8, 1950 |
| 2,634,134 | Dietz | Apr. 7, 1953 |
| 2,670,210 | Thompson | Feb. 23, 1954 |
| 2,673,089 | Osborne | Mar. 23, 1954 |
| 2,689,734 | Wennerbo et al. | Sept. 21, 1954 |
| 2,693,364 | Chalfin | Nov. 2, 1954 |
| 2,725,235 | Hull et al. | Nov. 29, 1955 |
| 2,762,627 | Johnson | Sept. 11, 1956 |

FOREIGN PATENTS

| | | |
|---|---|---|
| 539,492 | Great Britain | Sept. 12, 1941 |
| 1,021,306 | France | Feb. 17, 1953 |